(12) United States Patent
Salmonsen et al.

(10) Patent No.: US 6,233,628 B1
(45) Date of Patent: May 15, 2001

(54) SYSTEM AND METHOD FOR TRANSFERRING DATA USING SEPARATE PIPES FOR COMMAND AND DATA

(75) Inventors: Dan Salmonsen; Steven E. Olson, both of San Jose; Ning (Eric) Zhou, Fremont, all of CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/227,114

(22) Filed: Jan. 8, 1999

(51) Int. Cl.[7] .................................................. G06F 13/00
(52) U.S. Cl. .................... 710/27; 710/5; 710/27; 710/33; 710/126
(58) Field of Search ................. 710/1–7, 22–28, 710/33–75, 95–151

(56) References Cited

U.S. PATENT DOCUMENTS

| | | | | |
|---|---|---|---|---|
| 4,620,279 | * | 10/1986 | Read et al. ........................ | 710/22 |
| 4,782,442 | * | 11/1988 | Kojima et al. ..................... | 709/220 |
| 5,182,800 | * | 1/1993 | Farrell et al. ..................... | 710/24 |
| 5,247,616 | * | 9/1993 | Berggren et al. .................. | 709/212 |
| 5,761,457 | * | 6/1998 | Gulick ............................... | 710/128 |
| 5,861,893 | * | 1/1999 | Sturgess ............................ | 345/525 |
| 5,884,055 | * | 3/1999 | Tung et al. ........................ | 710/127 |
| 5,890,219 | * | 3/1999 | Scaringella et al. .............. | 711/162 |
| 5,933,654 | * | 8/1999 | Galdun et al. .................... | 710/23 |
| 5,964,863 | * | 10/1999 | Liu et al. .......................... | 712/32 |
| 5,991,824 | * | 11/1999 | Strand et al. ..................... | 710/1 |
| 6,052,744 | * | 4/2000 | Moriarty et al. ................. | 710/27 |
| 6,085,278 | * | 7/2000 | Gates et al. ...................... | 710/263 |
| 6,088,517 | * | 7/2000 | Wanner et al. ................... | 395/290 |
| 6,145,045 | * | 11/2000 | Falik et al. ....................... | 710/129 |
| 6,157,975 | * | 12/2000 | Brief et al. ....................... | 710/104 |

\* cited by examiner

Primary Examiner—Christopher B. Shin
(74) Attorney, Agent, or Firm—Townsend and Townsend and Crew LLP; Henry K. Woodward

(57) ABSTRACT

A computer system includes a host computer and a peripheral memory device such as a CD ROM which are interconnected by a bus including a plurality of pipes defined by packets, time division multiplexing, frequency division multiplexing, or code division multiplexing. A plurality of pipe configuration registers are maintained for controlling bus configuration. A BUS controller for the bus includes a plurality of registers for controlling data transfer including pipe data flow direction, packet size, control information, bandwidth setting, and descriptor pointer. The plurality of pipes can have different bandwidths and latencies to efficiently facilitate the transfer of commands, data, and control information. The peripheral memory device is able to transfer and receive data directly to and from the host computer using a dedicated pipe without the need of a buffer memory at the peripheral device.

27 Claims, 1 Drawing Sheet

SYSTEM AND METHOD FOR TRANSFERRING DATA USING SEPARATE PIPES FOR COMMAND AND DATA

BACKGROUND OF THE INVENTION

This invention relates generally to computer systems, and more particularly the invention relates to data transfer between a host computer and a peripheral memory device.

FIG. 1 illustrates a conventional computer system in which a host computer 10 is connected to peripheral devices through bus 12. The peripheral devices can include an I/O controller 14, a printer 16, and a memory device 18 such as a CD ROM. In transferring data from a CD ROM, the host computer 10 employs a procedure defined by the memory supplier in accessing the memory and establishing the transfer and control routine. Heretofore, the peripheral responds to data requests by retrieving the data from the medium, performing associated error correction and other tasks, and then temporarily storing the data in a buffer 20 within the peripheral. The data is then transferred over the bus to the host computer 10 at a later time when the bus becomes available for data transfer.

Thus, in prior art systems, a single command is sent to the CD ROM device and all processing associated with that command is performed in the device itself. This is an inefficient use of resources given that the host system typically has far greater processing and memory bandwidth. This increases the complexity and expense of the memory device.

SUMMARY OF THE INVENTION

In accordance with the invention, the processing capability and memory of the host computer system is employed in data transfers to and from a peripheral device such as a CD ROM and associated processing thereby reducing the processing and memory requirements of the peripheral and thus reducing the expense of the device.

In implementing the invention, a plurality of pipes or channels are established in the bus by packets, time division, frequency division, code division or other known techniques. The host computer can then issue commands to the peripheral in one pipe, for example, and receive or transfer data in one or more other pipes dedicated to data transfer. Status information can be provided in still another pipe. Importantly, the peripheral device does not require a buffer for temporary storage of transferred data but rather can immediately transfer the data to the host computer for storage in buffers available to the host and process of the data using the host computer. The host computer establishes the transfer protocol and maintains control of the data transfer through registers in a bus controller.

The invention and objects and features thereof will be more readily apparent from the following detailed description and appended claims when taken with the drawings.

DETAILED DESCRIPTION OF ILLUSTRATIVE EMBODIMENT

Figure 1:
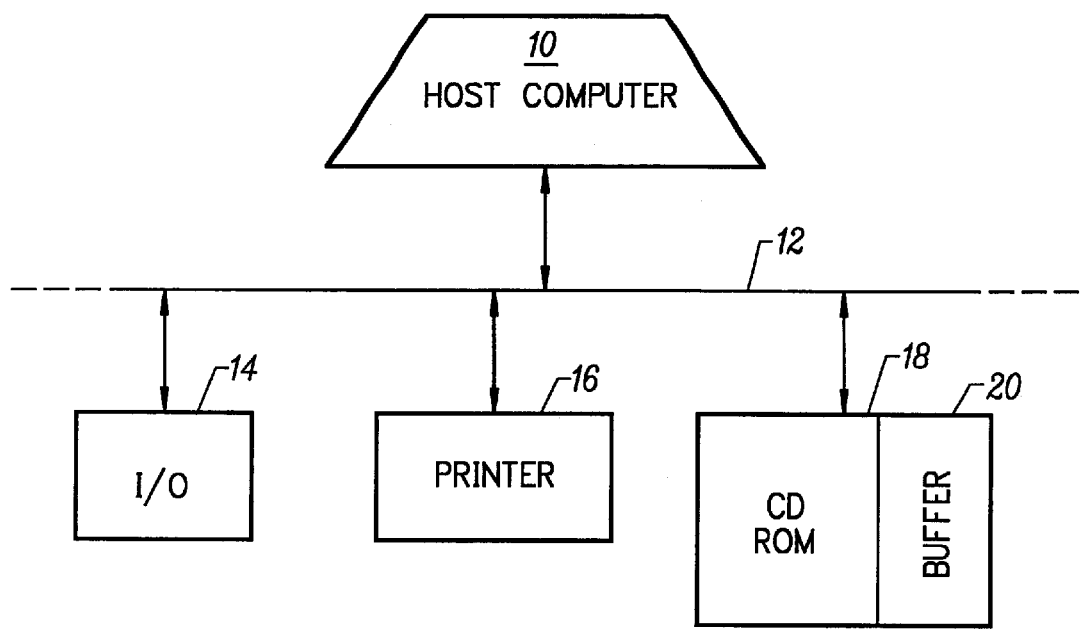
FIG. 1 is a functional block diagram of a computer system including a bus for data transfer in accordance with the prior art.
Figure 2:
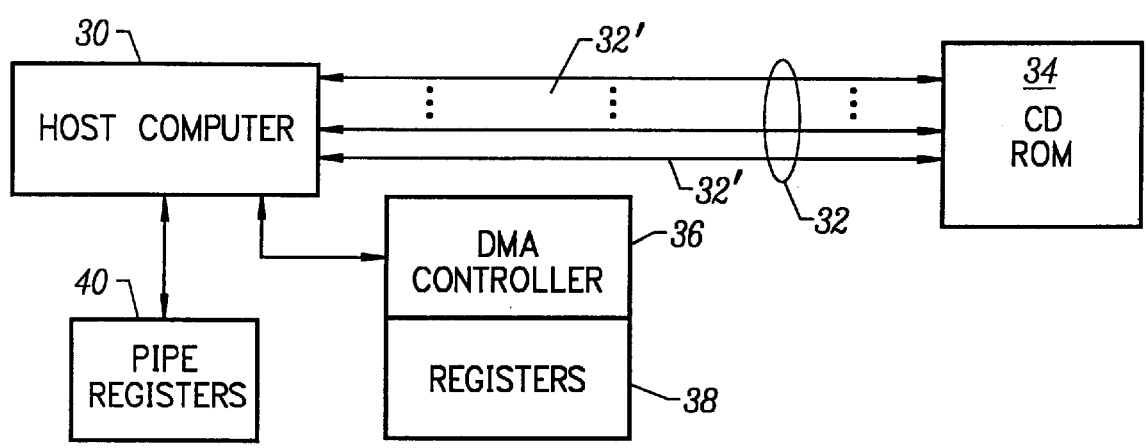
FIG. 2 is a functional block diagram of a computer system including a bus with multiple pipes for use in data transfer in accordance with the invention.

Referring now to FIG. 2, the host computer 30 is connected through bus 32 to an optical storage device 34 (such as a CD ROM, CD-R, CD R/W, or DVD) with bus 32 having a plurality of channels or pipes 32' defined by packets, time division multiplex, frequency division multiplex, code division multiplex, or other known technique. The various pipes may have different latencies and bandwidths to facilitate efficient use of the pipes in a data transfer, as will be described. In implementing a data transfer, host computer 30 utilizes a protocol established by the manufacturer of the peripheral memory or optical storage device 34, and configuration and control of bus 32 is implemented by a bus controller with integrated DMA controller 36 and associated registers 38 along with pipe registers 40. The DMA controller registers 38 and the pipe control registers will be specific to the associated bus (packets, time division multiplex, code division multiplex, etc.) and each corresponding embodiment but may be generalized in one embodiment as follows:

| Register | Read/Write | Description |
| --- | --- | --- |
| Interrupt | Read | Interrupt pending for this pipe |
| Pipe Direction | Read/Write | Send/Receive (relative to host) |
| Packet Size | Read/Write | Size of data packets on bus (4 to 128 bytes) |
| Control | Read/Write | Enable, start, stop, pause, disable |
| Status | Read | Halted error codes, X-off |
| Bandwidth | Read/Write | High, low |
| Descriptor Pointer | Read/Write | Points to descriptor block |

Note that these registers would be replicated for each pipe in a given system. Thus, a system that used eight pipes would require eight sets of registers. With the exception of the Descriptor Pointer Register, each set of registers would directly control the DMA Controller and the pipe associated with that set. The Descriptor Pointer Register holds a pointer to a memory block known as a descriptor. A descriptor is organized as follows:

| Name | Read/Write* | Description |
| --- | --- | --- |
| Link Pointer | Read/Write | Points to next descriptor |
| Buffer Pointer | Read/Write | Points to data buffer |
| Buffer Size | Read/Write | Amount of data to send/receive |
| Current Byte Count | Read | Amount of data currently transferred |
| Control | Read/Write | Additional control information |
| Status | Read | Current status of descriptor |

*Read only means that the hardware will write the value into the memory area.

In one embodiment data is transferred from a CD ROM device through the multiple pipes and into a linked list of buffers on the host. Commands are transferred to the device through a single pipe and status is passed from the device to the host through a different pipe. In this embodiment, commands are passed in Pipe 0, status received in Pipe 4, and data transferred in Pipes 1, 2, and 3. Pipe 1 transports user data, Pipe 2 carries auxiliary data, and Pipe 3 transmits subcode data. The pipe registers would therefore be configured thusly:

| | |
|---|---|
| Pipe-0 | |
| Pipe Direction | SEND |
| Packet Size | 4 Bytes |
| Control | ENABLE |
| Bandwidth | LOW |
| Descriptor Pointer | Address of Descriptor - 0 |
| Pipe-1 | |
| Pipe Direction | RECEIVE |
| Packet Size | 32 Bytes |
| Control | ENABLE |
| Bandwidth | HIGH |
| Descriptor Pointer | Address of Descriptor-1 |
| Pipe-2 | |
| Pipe Direction | RECEIVE |
| Packet Size | 32 Bytes |
| Control | ENABLE |
| Bandwidth | HIGH |
| Descriptor Pointer | Address of Descriptor-2 |
| Pipe-3 | |
| Pipe Direction | RECEIVE |
| Packet Size | 32 Bytes |
| Control | ENABLE |
| Bandwidth | LOW |
| Descriptor Pointer | Address of Descriptor-3 |
| Pipe-4 | |
| Pipe Direction | RECEIVE |
| Packet Size | 32 Bytes |
| Control | ENABLE |
| Bandwidth | LOW |
| Descriptor Pointer | Address of Descriptor-4 |

Commands will be sent over Pipe-0 and will be originating from the Host Computer. "Send" is defined to be originating from the host. Therefore, the Pipe Direction Register is set to "SEND". Because commands have been arbitrarily defined to be four bytes in this embodiment, the Packet Size register is set to four bytes. When the operation is to commence, a START value will be written into the Control Register. The Status register will contain the current status of the DMA controller. Bandwidth for the command channel will be low so the Bandwidth register will be set to "LOW". Descriptor Pointer holds a pointer to Descriptor-0. Descriptor-0 contains the following values:

| | |
|---|---|
| Link Pointer | NULL |
| Buffer Pointer | Address of Buffer-0 |
| Buffer Size | 4 (Bytes) |
| Control | 0 |

Link Pointer contains a NULL pointer, as no other descriptors will be chained to this one. Buffer Pointer points to the address of a four-byte buffer Buffer-0. Buffer-0 contains the command the device will execute. Buffer size is four and Control is set to 0. The remaining Pipes and Descriptors would be configured as follows:

| | |
|---|---|
| Descriptor-1 | |
| Link Pointer | NULL |
| Buffer Pointer | Address of Buffer-1 |
| Buffer Size | 2048 (Bytes) |
| Control | 0 |
| Descriptor-2 | |
| Link Pointer | NULL |
| Buffer Pointer | Address of Buffer-2 |
| Buffer Size | 320 (Bytes) |
| Control | 0 |
| Descriptor-3 | |
| Link Pointer | NULL |
| Buffer Pointer | Address of Buffer-3 |
| Buffer Size | 32 (Bytes) |
| Control | 0 |
| Descriptor-4 | |
| Link Pointer | NULL |
| Buffer Pointer | Address of Buffer-4 |
| Buffer Size | 32 (Bytes) |
| Control | 0 |

The DMA operation begins by setting the START bit in the Control register for Pipe-0. The DMA controller then transmits the four bytes of data in Buffer-0 over Pipe-0. The CD ROM device receives the four-byte command in Buffer-0 and proceeds accordingly. If the command is required to return data from media currently in the drive, the device will return the user data on Pipe-1, while auxiliary data and subcode data will be returned on Pipe-2 and Pipe-3 respectively. If an error code occurs during the data transfer, an error code will be transmitted to the host via Pipe-4 otherwise the host will process the data as needed on the host. For example, if an error is detected in the user data, the Error Correction Code (ECC) contained in the auxiliary data may be used to correct the user data. Because the auxiliary data is on the host with the user data, the host's processor may be used to perform the error correction. This is in contrast to the current art that performs all processing on the device and then transfers only the user data to the host.

If the host buffers are sufficiently large, chaining is not required. Otherwise descriptors for a given pipe must be chained together using the Link Pointer. This is a standard practice and well known to one skilled in the art.

There has been described an improved method and apparatus for data transfer from a peripheral memory device to a host computer through use of a bus having multiple pipes. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In a computer system in which a host computer interfaces with a peripheral memory device through a bus, a method of accessing data from the peripheral memory device comprising the steps of:
   a) establishing a plurality of data pipes in the bus,
   b) issuing commands from the host computer to the peripheral memory device using a first pipe,
   c) transferring data in response to the commands between the peripheral memory device and the host computer using at least one second pipe, and
   d) maintaining control of the data transfer using the first and second pipes through pipe configuration registers.

2. The method as defined by claim 1 and further including
   e) maintaining configuration of the bus through pipe configuration registers.

3. The method as defined by claim 1 and further including
   e) returning status from the peripheral memory device to the host computer through a third pipe.

4. The method as defined by claim 1 wherein step a) utilizes packets.

5. The method as defined by claim 1 where steps a) utilizes time division multiplexing.

6. The method as defined by claim 1 wherein step a) utilizes frequency division multiplexing.

7. The method as defined by claim 1 wherein step a) utilizes code division multiplexing.

8. The method as defined by claim 1 wherein step a) establishes data pipes having different bandwidths and latencies.

9. The method as defined by claim 1 wherein a BUS controller controls the bus and step d) includes providing pipe configuration registers at the BUS controller.

10. The method as defined by claim 9 and further including global registers at the host computer including a retry count and an interrupt.

11. The method as defined by claim 9 wherein each pipe has registers for pipe data flow direction, packet size, control information, bandwidth setting, and descriptor pointer.

12. The method as defined by claim 11 wherein the peripheral memory device comprises an optical storage device selected from the group consisting of CD ROM, CD-R, CD R/W and DVD.

13. The method as defined by claim 1 wherein the peripheral memory device comprises a CD device.

14. The method as defined by claim 1 wherein step c) further includes transferring data from the host computer to the peripheral memory device.

15. A computer system comprising:
   a host computer,
   a peripheral memory device,
   a bus including a first pipe for issuing commands from the host computer and at least a second pipe for transferring data between the host computer and the peripheral memory device in response to the commands from the host computer, and
   a plurality of pipe configuration registers for maintaining control of the bus and the data transfer using the first and second pipes.

16. The computer system as defined by claim 15 and further including a BUS controller for controlling data transfer on the bus, the plurality of pipe configuration registers being in the BUS controller.

17. The computer system as defined by claim 16 and further including global registers at the host computer including a retry count and an interrupt.

18. The computer system as defined by claim 17 wherein each pipe has registers for pipe data flow direction, packet size, control information, bandwidth setting, and descriptor pointer.

19. The computer system as defined by claim 18 wherein the peripheral memory device comprises a CD device.

20. The computer system as defined by claim 19 wherein the plurality of pipes are defined by packets.

21. The computer system as defined by claim 19 wherein the plurality of pipes are defined by time division multiplexing.

22. The computer system as defined by claim 19 wherein the plurality of pipes are defined by frequency division multiplexing.

23. The computer system as defined by claim 19 wherein the plurality of pipes are defined by code division multiplexing.

24. The computer system as defined by claim 19 wherein each pipe has registers for pipe data flow direction, packet size, control information, bandwidth setting, and descriptor pointer.

25. The computer system as defined by claim 24 and further including global registers at the host computer including a retry count and an interrupt.

26. The computer system as defined by claim 19 wherein the plurality of pipes have different bandwidths and latencies.

27. The computer system as defined by claim 15 wherein the plurality of pipes have different bandwidths and latencies.

* * * * *